J. BUCKLEY.
REPAIR LINK FOR CHAINS.
APPLICATION FILED JAN. 15, 1912.
1,083,661.
Patented Jan. 6, 1914.
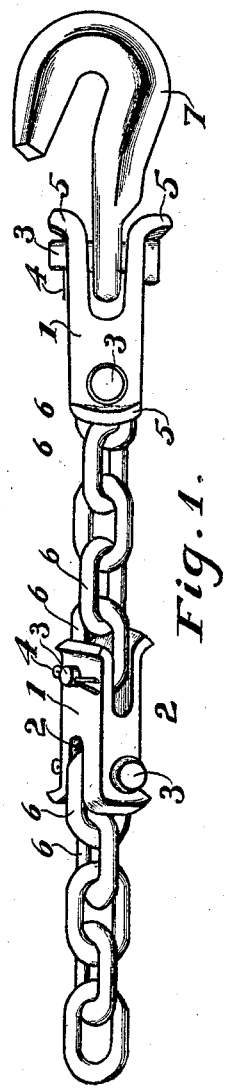
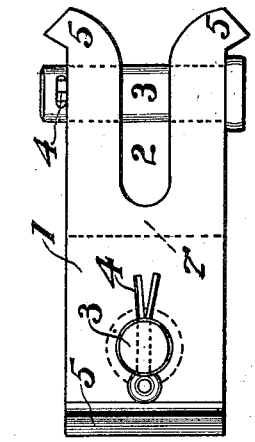
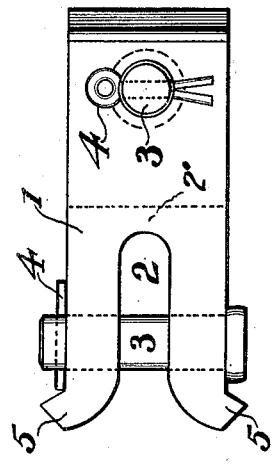
Witnesses
N. A. Buck
B. G. Richards
Inventor
John Buckley
By Joshua R. H. Potts
his Attorney.
COLUMBIA PLANOGRAPH CO., WASHINGTON, D. C.

UNITED STATES PATENT OFFICE.

JOHN BUCKLEY, OF CHICAGO, ILLINOIS.

REPAIR-LINK FOR CHAINS.

1,083,661.  Specification of Letters Patent.  Patented Jan. 6, 1914.

Application filed January 15, 1912. Serial No. 671,290.

*To all whom it may concern:*

Be it known that I, JOHN BUCKLEY, a citizen of the United States, and a resident of the city of Chicago, county of Cook, and State of Illinois, have invented certain new and useful Improvements in Repair-Links for Chains, of which the following is a specification.

My invention relates to improvements in repair links for chains, and has for its object the provision of a repair link of this character of improved construction and operation.

The invention consists in the combinations and arrangements of parts hereinafter described and claimed.

My invention will be best understood by reference to the accompanying drawings forming a part of this specification, and in which—

Figure 1 is a perspective view of a chain showing two links, embodying the invention, in position of use, Fig. 2, an enlarged elevation of a repair link embodying my invention, and Fig. 3 an elevation taken at right angles to that shown in Fig. 2.

The preferred form of construction, as illustrated in the drawings, comprises a block 1 having recesses 2 in its ends, the recess in one end being arranged at right angles to the recess in the other end, forming shank members 2′. The said shanks 2′ are provided with alining perforations adapted to receive locking pins 3, and cotter pins 4 are passed through the ends of pins 3 to hold the latter in locking positions. The outer ends 5 of the sides of shanks 2′ are turned outwardly, as shown.

In use, the end link 6 of the sections of a broken chain are inserted in recesses 2 and locking pins 3 passed through said links and recesses, said locking pins being secured in position by cotter pins 4, as shown. The outwardly turned ends 5 furnish sufficient material to support locking pins 3 against tearing out of the ends of the sides of the recesses and at the same time provide accommodations for the ends of link 6′ adjacent links 6 and which naturally lie in a plane at right angles to the plane of links 6. Thus, a strong and durable construction is provided for repairing a broken chain.

In Fig. 1, I have also illustrated the repair link in use for connecting a hook 7 to the end of a chain.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention, what I claim as new and desire to secure by Letters Patent, is:

A repair link comprising a block having a recess in each end thereof, the outer ends of the sides of said recess being turned outwardly and provided with alining perforations located substantially within said outwardly turned ends; and removable locking pins extending through said perforations, substantially as described.

In testimony whereof I have signed my name to this specification in the presence of two subscribing witnesses.

JOHN BUCKLEY.

Witnesses:
JOSHUA R. H. POTTS,
ARTHUR A. OLSON.